(12) United States Patent
Maier et al.

(10) Patent No.: US 11,970,100 B2
(45) Date of Patent: Apr. 30, 2024

(54) TABLE DEVICE FOR A VEHICLE

(71) Applicant: Daimler AG, Stuttgart (DE)

(72) Inventors: Valentin Maier, Ispringen (DE);
Christoph Menzel, Stuttgart (DE);
Bernd Plocher, Rottenburg (DE);
Benno Stamp, Stuttgart (DE)

(73) Assignee: Daimler AG, Stuttgart (DE)

(*) Notice: Subject to any disclaimer, the term of this patent is extended or adjusted under 35 U.S.C. 154(b) by 302 days.

(21) Appl. No.: 17/608,034

(22) PCT Filed: Mar. 13, 2020

(86) PCT No.: PCT/EP2020/056787
§ 371 (c)(1),
(2) Date: Nov. 1, 2021

(87) PCT Pub. No.: WO2020/221498
PCT Pub. Date: Nov. 5, 2020

(65) Prior Publication Data
US 2022/0212585 A1    Jul. 7, 2022

(30) Foreign Application Priority Data

May 2, 2019  (DE) .................. 10 2019 003 126.1

(51) Int. Cl.
*B60N 3/00*    (2006.01)
(52) U.S. Cl.
CPC .................................. *B60N 3/002* (2013.01)
(58) Field of Classification Search
CPC .. B60N 3/02; A47C 7/624; A47C 7/68; A47C 7/70

(Continued)

(56) References Cited

U.S. PATENT DOCUMENTS 5,547,248 A * 8/1996 Marechal ................. B60N 2/79
297/188.17
6,220,660 B1 * 4/2001 Bedro ...................... B60N 2/79
297/146

(Continued)

FOREIGN PATENT DOCUMENTS

DE    20 2011 106 677 U1    12/2011
DE    10 2014 207 451 A1    10/2015

(Continued)

OTHER PUBLICATIONS

PCT/EP2020/056787, International Search Report dated Jun. 17, 2020 (Two (2) pages).

(Continued)

*Primary Examiner* — Jose V Chen
(74) *Attorney, Agent, or Firm* — Crowell & Moring LLP

(57) ABSTRACT

A table device for an interior of a vehicle includes a table element that is positionable from a non-use position into a use position. The table element, secured to a pivot arm in the non-use position, forms a trim element of a center console of the vehicle. The pivot arm is secured to a frame element and the frame element is guided by a guide element through a predefined movement path. The frame element is liftable by a first drive unit through the predefined movement path such that the table element pivots out in part, through a predefined angle, from a housing formed by the center console. The table element is liftable by a second drive unit into the use position.

10 Claims, 10 Drawing Sheets

(58) Field of Classification Search
USPC .......................................... 108/44; 297/145
See application file for complete search history.

(56) References Cited

U.S. PATENT DOCUMENTS

| | | | | |
|---|---|---|---|---|
| 6,347,590 | B1* | 2/2002 | D'Annunzio | B60N 3/002 |
| | | | | 297/145 |
| 6,598,934 | B1* | 7/2003 | Anderson | B60N 3/002 |
| | | | | 297/145 |
| 7,311,354 | B2* | 12/2007 | Giasson | B64D 11/064 |
| | | | | 297/145 |
| 8,267,472 | B2* | 9/2012 | Large | B64D 11/00153 |
| | | | | 297/145 |
| 8,336,956 | B2* | 12/2012 | Westerink | B64D 11/0638 |
| | | | | 297/145 |
| 2005/0045071 | A1* | 3/2005 | Lindstrom | B60N 3/002 |
| | | | | 108/44 |
| 2010/0319588 | A1* | 12/2010 | Hanna | B60N 3/001 |
| | | | | 108/20 |
| 2016/0375810 | A1* | 12/2016 | Kong | B60N 2/793 |
| | | | | 297/145 |
| 2017/0029116 | A1* | 2/2017 | Veneruso | B60N 2/79 |
| 2018/0251057 | A1* | 9/2018 | Bywaters | B60R 7/04 |
| 2021/0093494 | A1* | 4/2021 | Duerstock | A61G 5/04 |

FOREIGN PATENT DOCUMENTS

| | | |
|---|---|---|
| DE | 10 2017 111 855 A1 | 12/2017 |
| DE | 10 2017 007 062 A1 | 1/2019 |

OTHER PUBLICATIONS

German-language German Office Action issued in German application No. 10 2019 003 126.1 dated Jan. 15, 2020 (Six (6) pages).

* cited by examiner

TABLE DEVICE FOR A VEHICLE

BACKGROUND AND SUMMARY OF THE INVENTION

The invention relates to a table device for an interior of a vehicle, the table device comprising a table element that is positionable from a non-use position into a use position.

A table device for a motor vehicle interior is known from DE 10 2014 207 451 A1. The table device comprises a table element that is movable or transferrable by means of an adjustment mechanism from a non-use position, i.e., from a stowed position, into a use position, i.e., a functional position. Furthermore, the table device has an interior trim element of the motor vehicle interior, the table element being a visible and flat part of the visible outer contour of the interior trim element when in the non-use position.

The object of the invention is to describe a table device for an interior of a vehicle, which table device is improved in comparison with the prior art and comprises a table element that is positionable from a non-use position into a use position.

In the case of a table device for an interior of a vehicle comprising a table element that is positionable from a non-use position into a use position, it is provided in accordance with the invention that the table element secured to a pivot arm forms, in its non-use position, a trim element of a center console, a first drive unit lifting a frame element, to which the pivot arm is secured and which is guided by means of a guide element, through a predefined movement path, so that the table element pivots out in part, through a predefined angle, from a housing formed by means of the center console, and a second drive unit being provided for lifting the table element into the use position.

The table element of the table device designed in this way can be used both by a vehicle user, i.e., a driver, and by a front-seat passenger of the vehicle, the table element being positioned for this purpose either in the use position intended for the vehicle user and the front-seat passenger or in one of the two lateral use positions.

The level of comfort provided when operating the table device is significantly increased by means of the kinematic system, automated by the drive units, for positioning the table element. Due to the fact that the table element in the non-use position is recessed in particular on the front face of the center console, it does not cause any hindrance to the vehicle user or the front-seat passenger during the positioning from the non-use position into the use position and back, and the table element is available for use by the vehicle user and the front-seat passenger.

Since a mechanism of the table device for positioning the table element is arranged relatively far forward, i.e., inside the center console in the region of the table element in the non-use position, further installation space within reach of occupants, in particular the vehicle user and the front-seat passenger, can be utilized.

In one embodiment, a forcibly controlled movement between the pivot arm and the table element results from a lateral pivoting of the table element, and the table element latches with the pivot arm in a lateral use position. The table element can thus be fixed in the lateral use position by means of a movement, specifically by means of the lateral pivoting thereof, without the need of a further actuation to fix the table element.

A further embodiment provides that a toothed belt unit is designed to perform the forcibly controlled movement. The toothed belt unit is a relatively simple device for performing a forcibly controlled movement without the need, as described above, for a further actuation to fix the table element in the lateral use position.

In a further possible embodiment, the toothed belt unit comprises at least one gearwheel mounted rotatably about a rotation axis, a further gearwheel mounted rotatably about a further rotation axis, and a toothed belt which is mechanically engaged with both gearwheels. A simple connection is thus produced in order to fix the table element in one of the lateral use positions by means of the lateral pivoting.

In a refinement of the table device, a further actuation element is designed to cancel the latching between table element and pivot arm, the latching being released under pressure exerted by an occupant onto the actuation element and the table element being positionable into the non-use position, which can also be referred to as the stowed position.

A possible embodiment of the table device provides that the table element comprises two parts which can be folded open so that a top surface can be enlarged and multiple and/or large objects can be placed on the table element, accordingly.

In a further possible embodiment, at least a part of the table element and/or of the pivot arm is hollow, at least in part. In particular, the table element and the pivot arm are hollow so that a cable, for example for a USB connector and/or another connector element, can be integrated into the table element via the pivot arm.

In order to be able to pivot the table element laterally, in a possible refinement of the table device at least one hinge is arranged on the pivot arm and/or the table element. The lateral pivoting can be realized by means of the at least one hinge, the table element additionally being connected to the pivot arm additionally by means of the at least one hinge.

Furthermore, the table element in one design of the table device is formed from metal and/or plastic, the plastic possibly being fiber-reinforced in order to increase the rigidity of the table element. In this case, a metal and/or a plastic having a relatively low weight are/is selected, so that the weight of the table element itself is low accordingly.

In addition, the top surface of the table element in one possible embodiment has an anti-slip coating, so that a shifting of objects placed on the table element, in particular while the vehicle is travelling, can be eliminated to the greatest possible extent. The placed object or the placed objects adhere to the top surface, so that the risk of falling off and any resultant damage is reduced at least significantly.

The exemplary embodiments of the invention are explained hereinafter in greater detail with reference to drawings.

DETAILED DESCRIPTION OF THE DRAWINGS

Parts that correspond to one another are provided in all figures with the same reference signs.

Figure 1:
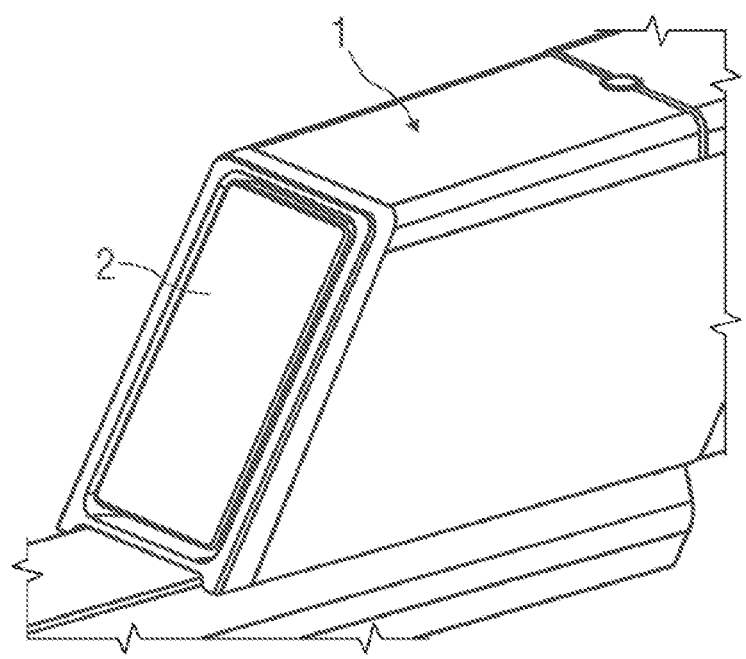
FIG. 1 shows schematically a perspective view of a detail of a center console of a vehicle with an integrated table device comprising a table element in a non-use position.

FIG. 1 shows a perspective view of a center console 1 of a vehicle (not shown in greater detail) which can be a utility vehicle or a passenger vehicle. In this case, the center console 1 is arranged in particular between a driver's seat and a front passenger seat of the vehicle.

In order to allow a vehicle user, in particular a driver of the vehicle, and/or a front-seat passenger to set down at least one object, for example while the vehicle is travelling, a table device T, shown in greater detail in FIGS. 2 to 11 and described hereinafter, is provided.

The table device T comprises a two-part collapsible table element 2 which, in the non-use position, forms a trim part for a front face of the center console 1, the table element 2 being arranged partly recessed in the center console 1, as shown in FIG. 1. In the collapsed state the two parts forming the table element 2 bear against one another.

Furthermore, the table device T comprises a pivot arm 3, shown in the subsequent figures, to which the table element 2 is secured, with the pivot arm 3 being connected at an end opposite the table element 2 to a movably mounted frame element 4. A movement path of the frame element 4 is predefined and delimited by means of a guide element 5 having two cut-outs A, the frame element 4 engaging for this purpose in part in the oppositely arranged cut-outs A so that a connection between the frame element 4 and the guide element 5 is reduced.

The table device T is designed in such a way that the table element 2 is moved automatically from the non-use position into the use position and back, with two drive units 6, 7, which are designed in particular as linear motors, being provided for this purpose.

Figure 2:
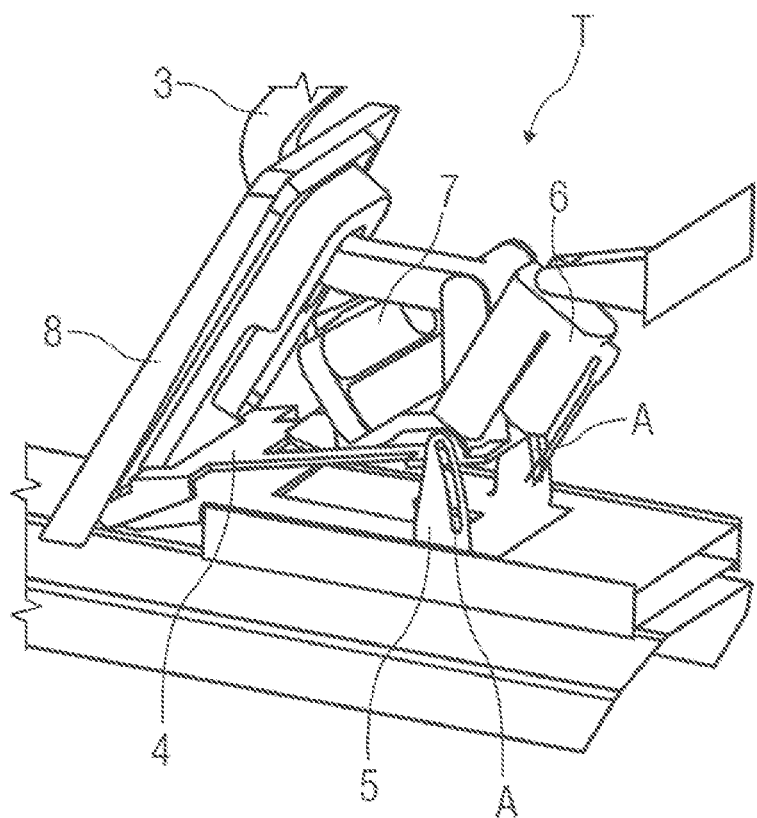
FIG. 2 shows schematically a first perspective view of a detail of the table device.
Figure 3:
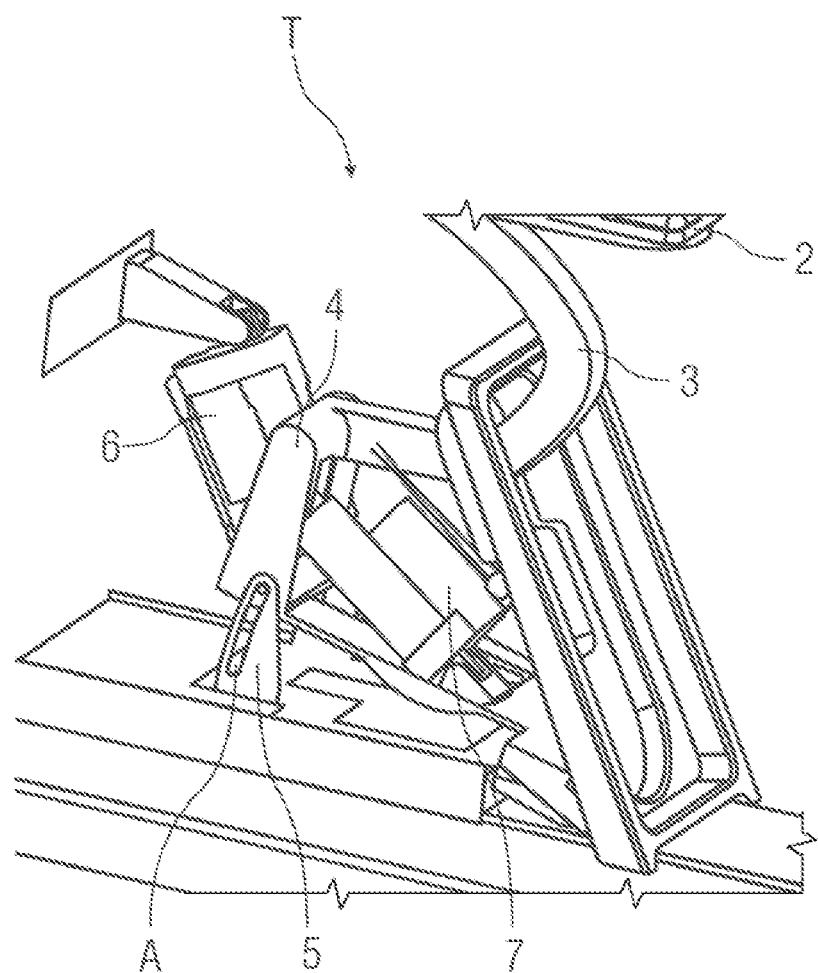
FIG. 3 shows schematically a second perspective view of a detail of the table device.
Figure 4:
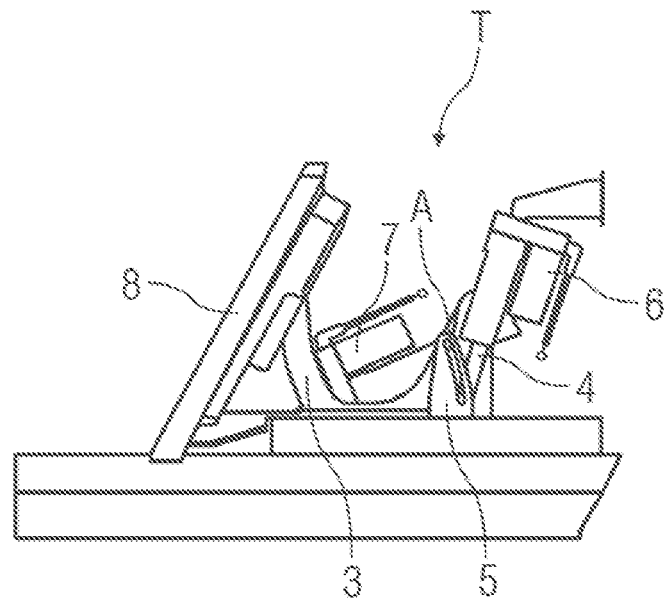
FIG. 4 shows schematically a side view of the table device in the non-use position.
Figure 5:
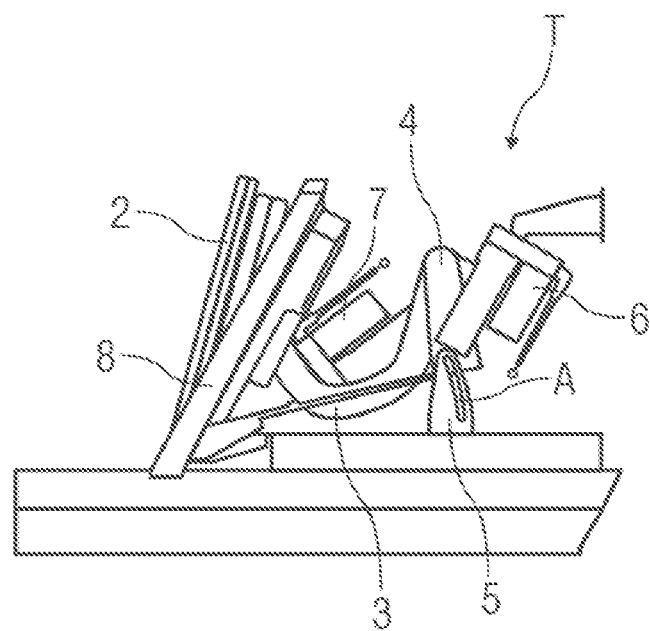
FIG. 5 shows schematically a side view of the table device with tilted table element.

FIG. 4 shows the table device T in the non-use position in a side view, with a side trim of the center console 1 not being shown, although a frame 8 which is arranged on the front face is indeed shown and is also shown in FIGS. 2 and 3.

In order to position the table element 2 in the use position, the vehicle user or the front-seat passenger actuates an actuation element, not shown in greater detail, which is arranged, for example, on the center console 1.

By actuating the actuation element, a first drive unit 6 is activatable, so that the table element 2 tilts out in part, through a predefined angle, from a housing formed by means of the center console 1. The table element 2 thus positions itself relative to the frame 8, the table element 2 being set at an incline.

To set the table element 2 at an incline, the frame element 4 with the pivot arm 3 secured thereto is lifted by means of the first drive unit 6, thus resulting in the tilting movement of the table element 2.

Figure 6:
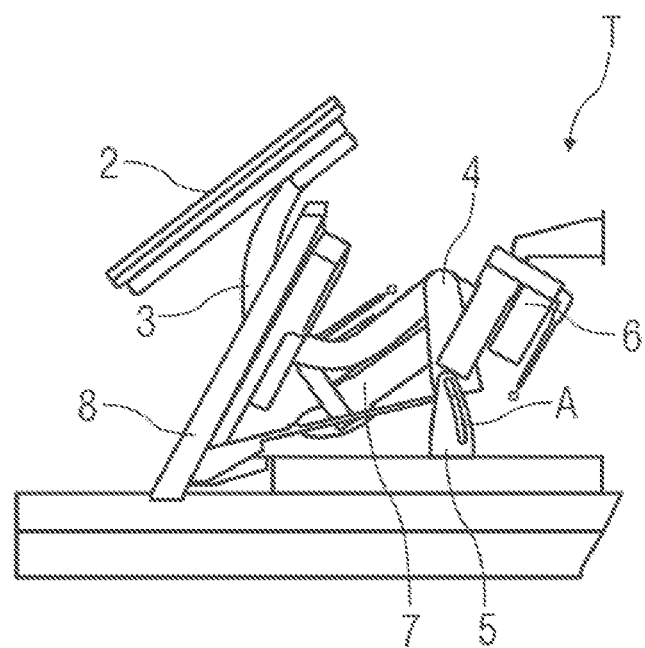
FIG. 6 shows schematically a side view of the table device during a positioning of the table element.
Figure 7:
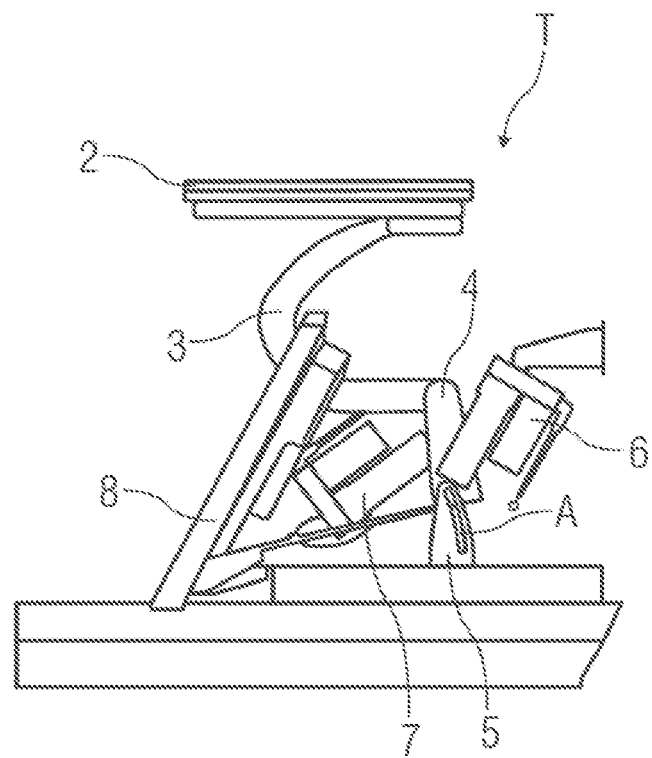
FIG. 7 shows schematically a side view of the table device with the table element in a use position.
Figure 8:
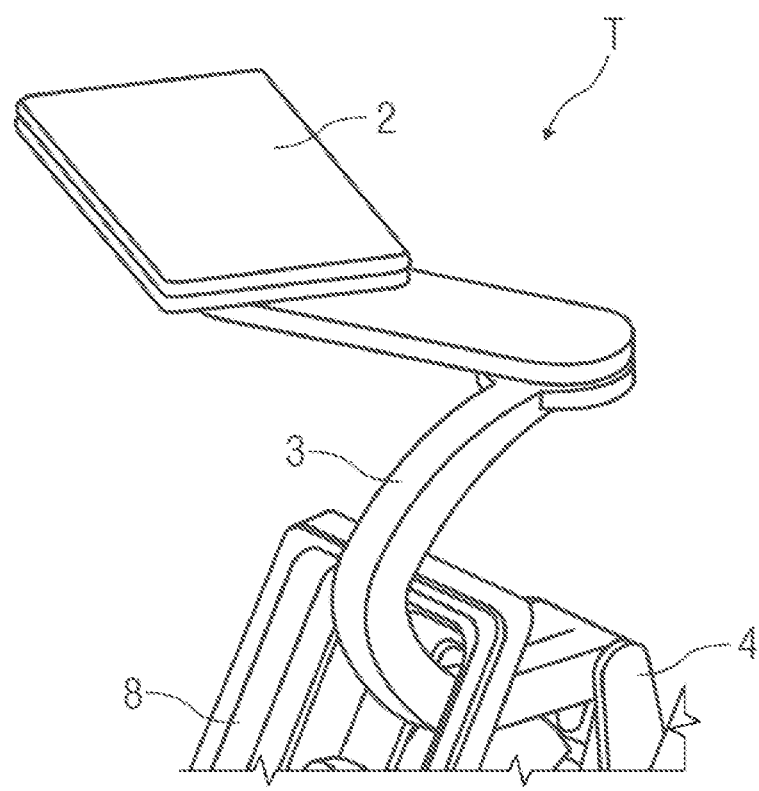
FIG. 8 shows schematically a perspective view of a detail of the table device during a lateral pivoting of the table element.

If a second drive unit 7 has not yet been activated, it is activated once the table element 2 has been set at an incline, so that the pivot arm 3 with the table element 2 secured thereto is lifted, as shown in FIG. 6. The table element 2 pivoted into the use position or also starting position is shown in FIG. 7. In the use position, the frame element 4 is disposed against an upper stop of the guide element 5, and the table element 2 in this use position can be used both by the vehicle user and by the front-seat passenger in order to set down objects. In order to enlarge a top surface of the table element 2, it can be folded open.

In particular, the table element 2 is formed from a metallic and/or plastic-based material, which may be fiber-reinforced, and a particular top surface or at least the top surface that is provided when the table element 2 has been swung out can be provided with an anti-slip coating so that any objects set down adhere on the table element 2 and therefore a shifting of these objects while the vehicle is travelling can be prevented to the greatest possible extent.

Rubber, dimpled plastic, a film and/or another suitable coating can be used as anti-slip coating.

In order to position the table element 2 in the direction of the vehicle user or the front-seat passenger, the table element 2 is manually pivoted horizontally in the relevant direction. To this end, for example, two relatively large hinges, not shown in greater detail, are provided, by means of which the lateral pivoting movement of a portion of the pivot arm 3 with the table element 2 is possible.

Figure 9:
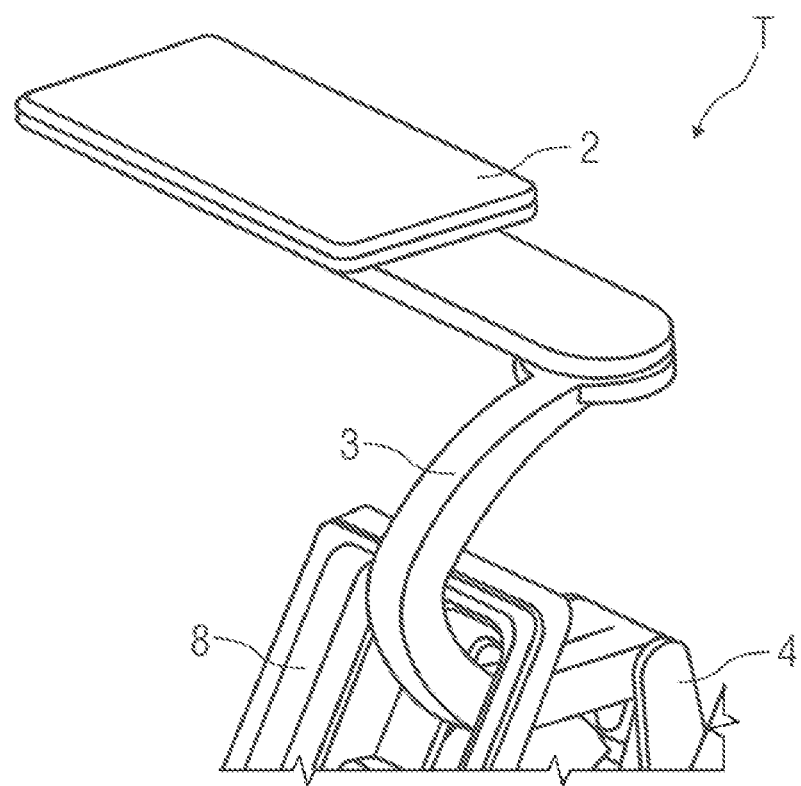
FIG. 9 shows schematically a perspective view of a detail of the table device with the table element in a lateral use position.

A forcibly controlled movement between the table element 2 and the pivot arm 3 results from this lateral pivoting movement, so that the table element 2 in a lateral use position shown in FIG. 9 latches in place and is thus fixed in the use position.

Figure 10:
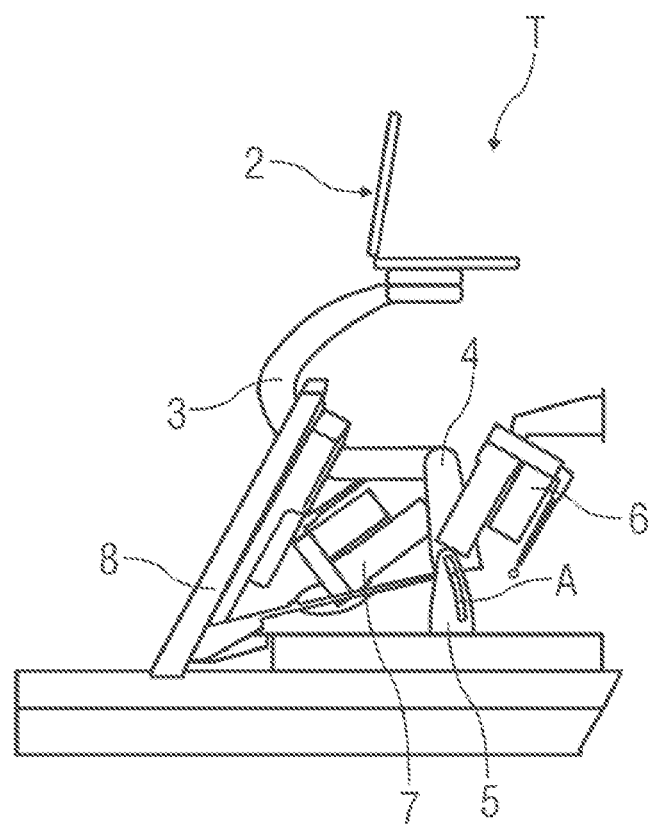
FIG. 10 shows schematically a side view of the table device during a folding open of the table element positioned in the lateral use position.
Figure 11:
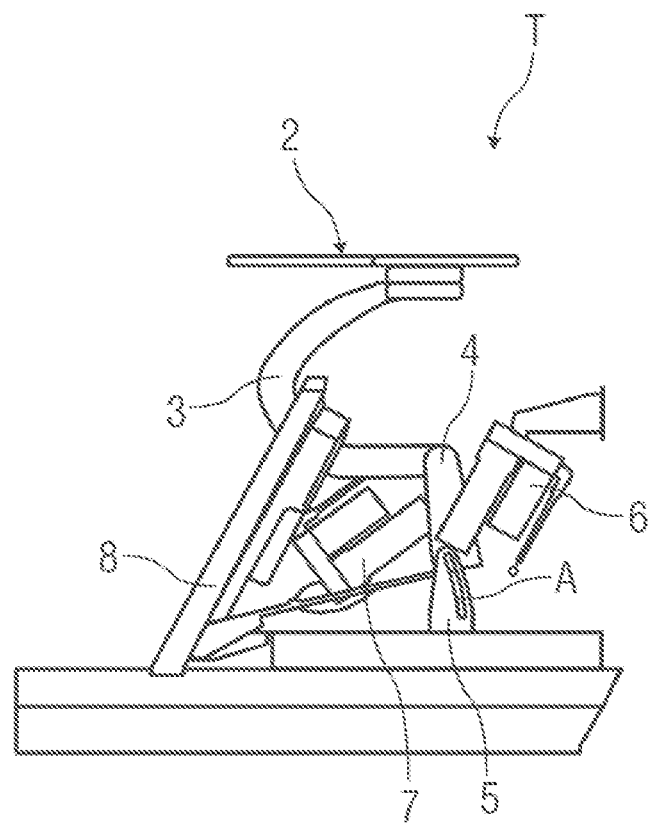
FIG. 11 shows schematically a side view of the table device with the folded-open table element.

FIG. 10 shows the table device T when folding open the table element 2 positioned in one of the lateral use positions, so that the top surface is enlarged, in particular is doubled, as shown in FIG. 11.

Figure 12:
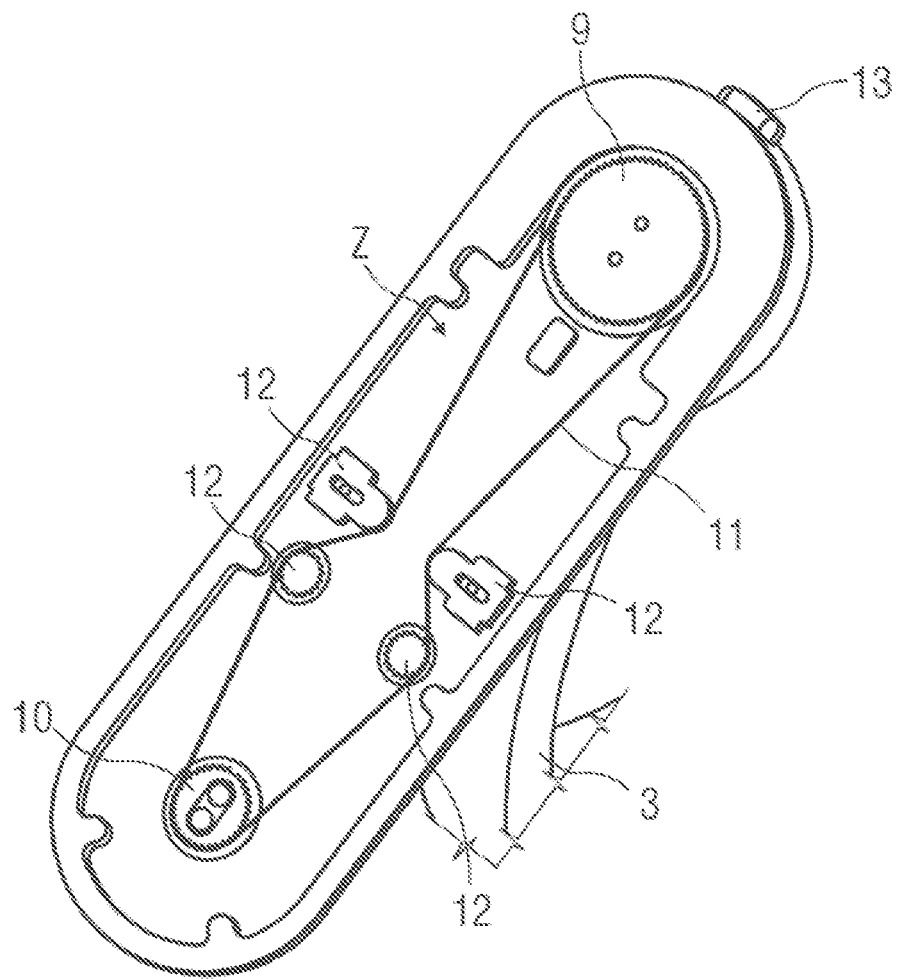
FIG. 12 shows schematically a toothed belt drive for latching the table element.

FIG. 12 shows a toothed belt unit Z integrated into the pivot arm 3 for latching the table element 2.

The toothed belt unit Z comprises two gearwheels 9, 10, a toothed belt 11 and, according to the present exemplary embodiment in FIG. 12, four deflection elements 12. The two gearwheels 9, 10 are operatively connected by means of the toothed belt 11, so that, as the table element 2 is pivoted and during a resultant rotary movement of one gearwheel 9, 10, the other gearwheel 10, 9 also rotates.

If the gearwheel 9 rotates on account of the horizontal pivoting movement of the table element 2 in the direction of the vehicle user or the front-seat passenger about its rotation axis, the further gearwheel 10 thus also rotates, at a different speed according to its size, as a result of the rotary movement transferred to the toothed belt 11.

If the table element 2 is in the final lateral use position, the table element 2 latches with the pivot arm 3, so that the table element 2 is fixed in the lateral use position.

A further actuation element 13 is arranged on the pivot arm 3, by means of which further actuation element, when this is actuated, the latching of the table element 2 with the pivot arm 3 can be cancelled, so that the table element 2 can be positioned in the use position or in the opposite lateral use position.

In one design of the table device T, the table element 2 and the pivot arm 3 are hollow, so that at least one cable, for example for a USB connector, can be integrated in the table element 2 and the pivot arm 3, so that the cable is not arranged loosely on the table device T and is not bothersome.

By means of the table device T designed in this way, the table element 2 can be positioned in a motorized manner from its non-use position into the use position, or also starting position.

The invention claimed is:

1. A table device (T) for an interior of a vehicle, comprising:
   a table element (2) that is positionable from a non-use position into a use position;
   a pivot arm (3), wherein the table element (2) secured to the pivot arm (3) in the non-use position forms a trim element of a center console (1) of the vehicle;
   a frame element (4), wherein the pivot arm (3) is secured to the frame element (4);
   a guide element (5), wherein the frame element (4) is guided by the guide element (5) through a predefined movement path;
   a first drive unit (6), wherein the frame element (4) is liftable by the first drive unit (6) through the predefined movement path such that the table element (2) pivots out in part, through a predefined angle, from a housing formed by the center console (1); and
   a second drive unit (7), wherein the table element (2) is liftable by the second drive unit (7) into the use position.

2. The table device (T) according to claim 1, wherein a forcibly controlled movement between the pivot arm (3) and the table element (2) results from a lateral pivoting of the table element (2) and wherein the table element (2) latches in place in a lateral use position.

3. The table device (T) according to claim 2, wherein a hinge for performing the lateral pivoting is disposed on the pivot arm (3) or on the table element (2).

4. The table device (T) according to claim 2, wherein a toothed belt unit (Z) is configured to perform the forcibly controlled movement.

5. The table device (T) according to claim 4, wherein the toothed belt unit (Z) comprises a first gearwheel (9) mounted rotatably about a first rotation axis, a second gearwheel (10) mounted rotatably about a second rotation axis, and a toothed belt (11) which is mechanically engaged with both the first gearwheel (9) and the second gearwheel (10).

6. The table device (T) according to claim 1, wherein an actuator is configured to cancel a latching between the table element (2) and the pivot arm (3).

7. The table device (T) according to claim 1, wherein the table element (2) comprises a first part and a second part that can be folded open.

8. The table device (T) according to claim 1, wherein at least a part of the table element (2) and a part of the pivot arm (3) are hollow.

9. The table device (T) according to claim 1, wherein the table element (2) is formed from a metal or a plastic.

10. The table device (T) according to claim 1, wherein a top surface of the table element (2) has an anti-slip coating.

\* \* \* \* \*